US011153620B2

(12) United States Patent
Zeng

(10) Patent No.: US 11,153,620 B2
(45) Date of Patent: Oct. 19, 2021

(54) MEDIA BROADCASTING METHOD, SERVER, TERMINAL DEVICE, AND STORAGE MEDIUM

(71) Applicant: TENCENT TECHNOLOGY (SHENZHEN) COMPANY LIMITED, Shenzhen (CN)

(72) Inventor: Lingming Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/779,736

(22) Filed: Feb. 3, 2020

(65) Prior Publication Data

US 2020/0177938 A1 Jun. 4, 2020

Related U.S. Application Data

(63) Continuation of application No. PCT/CN2018/097846, filed on Aug. 1, 2018.

(30) Foreign Application Priority Data

Aug. 1, 2017 (CN) .......................... 201710648069.9

(51) Int. Cl.
*H04N 21/258* (2011.01)
*H04N 21/254* (2011.01)
(Continued)

(52) U.S. Cl.
CPC ..... *H04N 21/2541* (2013.01); *H04N 21/2393* (2013.01); *H04N 21/25891* (2013.01); *H04N 21/845* (2013.01)

(58) Field of Classification Search
None
See application file for complete search history.

(56) References Cited

U.S. PATENT DOCUMENTS 8,850,469 B1 * 9/2014 Yang .................. H04N 21/8549
725/28
9,674,579 B1 * 6/2017 Jaini .................. H04N 21/6582
(Continued)

FOREIGN PATENT DOCUMENTS

| CN | 104410902 A | 3/2015 |
| CN | 105704583 A | 6/2016 |

(Continued)

OTHER PUBLICATIONS

The World Intellectual Property Organization (WIPO) International Search Report for PCT/CN2018/097846 dated Oct. 22, 2018 5 Pages (including translation).

*Primary Examiner* — William J Kim
(74) *Attorney, Agent, or Firm* — Anova Law Group, PLLC

(57) ABSTRACT

A media broadcasting method includes: receiving, by a server, a playing request transmitted by a terminal device, the playing request requesting to play media segments; querying, by the server, a segment index file of the media segments according to the playing request; determining, by the server, a target segment set according to the segment index file of the media segments, the target segment set comprising segments for which the terminal device has playing authority in the media segments; determining, by the server, a target segment index file corresponding to the target segment set; and transmitting, by the server, the target segment index file to the terminal device.

19 Claims, 6 Drawing Sheets

(51) Int. Cl.
    *H04N 21/239*    (2011.01)
    *H04N 21/845*    (2011.01)

(56) References Cited

U.S. PATENT DOCUMENTS

| | | | | |
|---|---|---|---|---|
| 10,643,074 | B1* | 5/2020 | McAninly | G06K 9/00744 |
| 2002/0013941 | A1* | 1/2002 | Ward, III | H04N 7/163 |
| | | | | 725/25 |
| 2002/0147782 | A1* | 10/2002 | Dimitrova | H04N 21/4542 |
| | | | | 709/207 |
| 2003/0093790 | A1* | 5/2003 | Logan | G11B 27/34 |
| | | | | 725/38 |
| 2014/0325557 | A1* | 10/2014 | Evans | H04N 21/4307 |
| | | | | 725/34 |
| 2015/0304390 | A1* | 10/2015 | Chakarapani | H04N 21/47202 |
| | | | | 709/217 |
| 2015/0382042 | A1* | 12/2015 | Wagenaar | H04L 65/605 |
| | | | | 725/34 |
| 2016/0014439 | A1* | 1/2016 | Friedrich | H04N 21/8543 |
| | | | | 725/92 |
| 2016/0164841 | A1* | 6/2016 | Mikhailov | H04N 21/4318 |
| | | | | 726/12 |
| 2016/0182949 | A1* | 6/2016 | Fung | H04N 21/4751 |
| | | | | 725/28 |
| 2017/0264923 | A1* | 9/2017 | Lacivita | G11B 27/102 |
| 2018/0176623 | A1* | 6/2018 | Nugent | H04N 21/6547 |
| 2018/0359477 | A1* | 12/2018 | Yang | H04N 19/139 |
| 2019/0116101 | A1* | 4/2019 | Harb | H04N 21/4424 |
| 2020/0107067 | A1* | 4/2020 | Uchimura | G11B 20/00137 |

FOREIGN PATENT DOCUMENTS

| | | |
|---|---|---|
| CN | 106028154 A | 10/2016 |
| CN | 107231568 A | 10/2017 |

\* cited by examiner

MEDIA BROADCASTING METHOD, SERVER, TERMINAL DEVICE, AND STORAGE MEDIUM

RELATED APPLICATIONS

This application claims priority to PCT Application No. PCT/CN2018/097846, filed on Aug. 1, 2018, which claims priority to Chinese Patent Application No. 2017106480699, filed with the Chinese Patent Office on Aug. 1, 2017, and entitled "MEDIA BROADCASTING METHOD, SERVER, AND TERMINAL DEVICE", which are both incorporated herein by reference in their entirety.

FIELD OF THE TECHNOLOGY

The present application relates to the technical field of online live broadcasting, and in particular, to a media broadcasting method, a server, a terminal device, and a storage medium.

BACKGROUND OF THE DISCLOSURE

A user can search online video data provided by various video providers. However, in consideration of different user authority levels or user groups, some video data can only be watched by member users, and some video data may include restricted content such as violent or adult content that are inappropriate for children or teenagers. Video providers need to provide video data differently to users mainly in the following three manners: (1) cutting restricted portions, storing video data of different video resources in different categories to provide appropriate video data to different users; (2) pixelating restricted parts; (3) storing a plurality of copies of video data, that is, storing both original video data and a plurality of copies of video data without restricted parts.

However, when all restricted content is cut or pixelated, watching demands of different groups of users cannot be met. When a plurality of copies of video data are stored (including cut copies and uncut copies), it is impossible to provide a single watchable copy of video data to different groups of users. Moreover, servers are subject to extra storage pressure for distribution of different versions of video data to different users.

SUMMARY

According to various embodiments of the present application, a media broadcasting method, a server, a terminal device, and a storage medium are provided.

One aspect of the present disclosure provides a media broadcasting method. The method includes: receiving, by a server, a playing request transmitted by a terminal device, the playing request requesting to play media segments; querying, by the server, a segment index file of the media segments according to the playing request; determining, by the server, a target segment set according to the segment index file of the media segments, the target segment set comprising segments for which the terminal device has playing authority in the media segments; determining, by the server, a target segment index file corresponding to the target segment set; and transmitting, by the server, the target segment index file to the terminal device.

Another aspect of the present disclosure provides a media broadcasting method. The method includes: transmitting, by a terminal device, a playing request to a server, the playing request requesting to play media segments; receiving, by the terminal device, a target segment index file transmitted by the server, the target segment index file comprising segment indexes of segments in a target segment set, the target segment set being determined after the server queries a segment index file of the media segments according to the playing request, and the target segment set comprising segments for which the terminal device has playing authority in the media segments; and downloading, by the terminal device, the target segment set from the server according to the target segment index file.

Another aspect of the present disclosure provides a media broadcasting server. The server includes: receiving a playing request transmitted by a terminal device, the playing request requesting to play media segments; querying a segment index file of the media segments according to the playing request; determining a target segment set according to the segment index file of the media segments, and the target segment set comprising segments for which the terminal device has playing authority in the media segments; determining a target segment index file corresponding to the target segment set; and transmitting the target segment index file to the terminal device through a transceiver module to enable the terminal device to download the target segment set according to the target segment index file.

Another aspect of the present disclosure provides a non-transitory computer readable medium storing computer instructions executable by a processor. The computer instructions, when being executed by a processor, cause the processor to perform: receiving a playing request transmitted by a terminal device, the playing request requesting to play media segments; querying a segment index file of the media segments according to the playing request; determining a target segment set according to the segment index file of the media segments, and the target segment set comprising segments for which the terminal device has playing authority in the media segments; determining a target segment index file corresponding to the target segment set; and transmitting the target segment index file to the terminal device through a transceiver module to enable the terminal device to download the target segment set according to the target segment index file.

Another aspect of the present disclosure provides a terminal device. The terminal device includes: a transceiver module, configured to transmit a playing request to a server, the playing request being configured for playing downloaded media segments, the transceiver module being further configured to receive a target segment index file transmitted by the server, the target segment index file comprising segment indexes of segments in a target segment set, the target segment set being a segment set determined after the server queries a segment index file of the media segments according to the playing request, and the target segment set comprising segments for which the terminal device has playing authority in the media segments; and a processing module, configured to download the target segment set from the server according to the target segment index file received by the transceiver module.

Another aspect of the present disclosure provides a terminal device. The terminal device includes: a memory and one or more processors, the memory storing computer-readable instructions, and the computer-readable instructions being executed by the one or more processors to enable the one or more processors to perform the following operations: transmitting a playing request to a server, the playing request being configured for playing downloaded media segments; receiving a target segment index file transmitted by the server, the target segment index file comprising segment indexes of segments in a target segment set, the target segment set being a segment set determined after the server queries a segment index file of the media segments according to the playing request, and the target segment set comprising segments for which the terminal device has playing authority in the media segments; and downloading the target segment set from the server according to the target segment index file received by a transceiver module.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show only some embodiments of the present application, and a person of ordinary skill in the art may still derive other accompanying drawings from these accompanying drawings without creative efforts.

DESCRIPTION OF EMBODIMENTS

In the specification, claims, and the foregoing accompanying drawings of the present application, the terms "first", "second", and the like are intended to distinguish between similar objects rather than indicating a specific order. It is to be understood that the data configured in such a way is interchangeable in proper cases, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or modules and is not necessarily limited to those steps or modules, but may include other units not expressly listed or inherent to such a process, method, system, product, or device. The division of modules in the present application is just a logical division, the division of implementation in practical application can have other ways, for example, a plurality of modules can be combined into or integrated in another system, or some characteristics can be ignored, or not performed. In addition, the coupling or direct coupling or communication connection shown or discussed between each other may be through some interfaces, and the indirect coupling or communication connection between modules may be electrical or otherwise similar and is not limited in the present application. In addition, the modules or submodules described as separate parts may or may not be physically separate, and the parts may or may not be physical modules, or may be distributed in a plurality of circuit modules. Some or all of the modules may be selected according to actual needs to achieve the objectives of the solutions of the embodiments of the present application.

Figure 1:
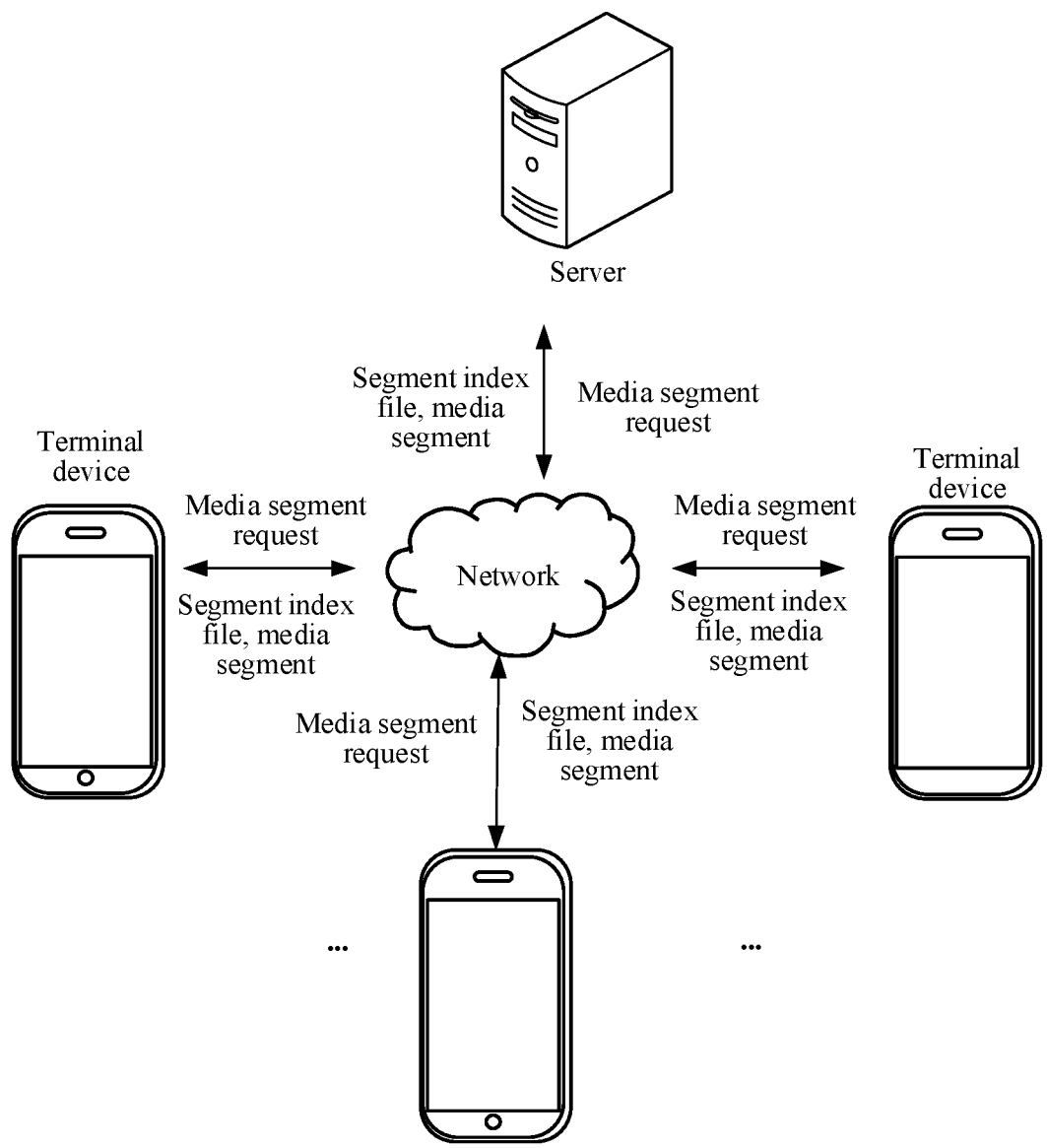
FIG. 1 is a schematic diagram of a network topology structure according to an embodiment of the present application.

The present application provides a media broadcasting method, a server, and a terminal device, which can be applied to the technical field of live broadcasting. Detailed descriptions are provided below. FIG. 1 is a network topological graph of a streaming media transmission. The server stores various video resources. Each video resource includes a plurality of segments with different bit rates. The server is configured to create a client, configure various information of the client, and process various requests for the client on the terminal device, and in addition, is further configured to store operation data of a user using the client. An interactive client is installed on the terminal device and can respond to various operation instructions of the user using the client and interact with the server.

In the present application, the terminal device transmits a playing request to the server to request segments with different bit rates, and then plays the segments on the client installed on the terminal device.

In particular, the terminal device used in the present application may be a device which provides voice and/or data connectivity to users, a hand-held device with a function of wireless connection, or other processing devices connected to a wireless modem. The terminal device can communicate with one or more core networks through a radio access network (RAN). The terminal device may be a mobile terminal, for example, a mobile phone (or referred to as a "cellular" phone) or a computer with a mobile terminal, which may be, for example, a portable, pocket-sized, hand-held, computer-based or vehicle-mounted mobile device and exchange voice and/or data with the RAN. For example, the terminal device is a personal communications service (PCS) phone, a cordless phone, a session initiation protocol (SIP) phone, a wireless local loop (WLL) station, a personal digital assistant (PDA) or another device. The terminal device may also be referred to as a system, a subscriber unit, a subscriber station, a mobile station, a mobile, a remote station, an access point, a remote terminal, an access terminal, a user terminal, a terminal device, a user agent, a user device, or user equipment.

The server may first determine whether media segments requested by the terminal device include restricted segments. The server determines whether the terminal device has authority to play restricted segments when the media segments include the restricted segments. The server may delete or hide segment index information of the restricted segments in a segment index file of the media segments when the terminal device does not have authority, and then transmits the processed segment index file to the terminal device. Accordingly, the terminal device can only download segments other than the restricted segments. However, the server may transmit a segment index file including the restricted segments to the terminal device when the terminal device has playing authority for the restricted segments. Accordingly, the terminal device can download the media segments including the restricted segments. The server directly transmits a segment index file of the media segments to the terminal device when the media segments do not include any restricted segment, and the terminal device may directly download all the media segments.

Figure 2:
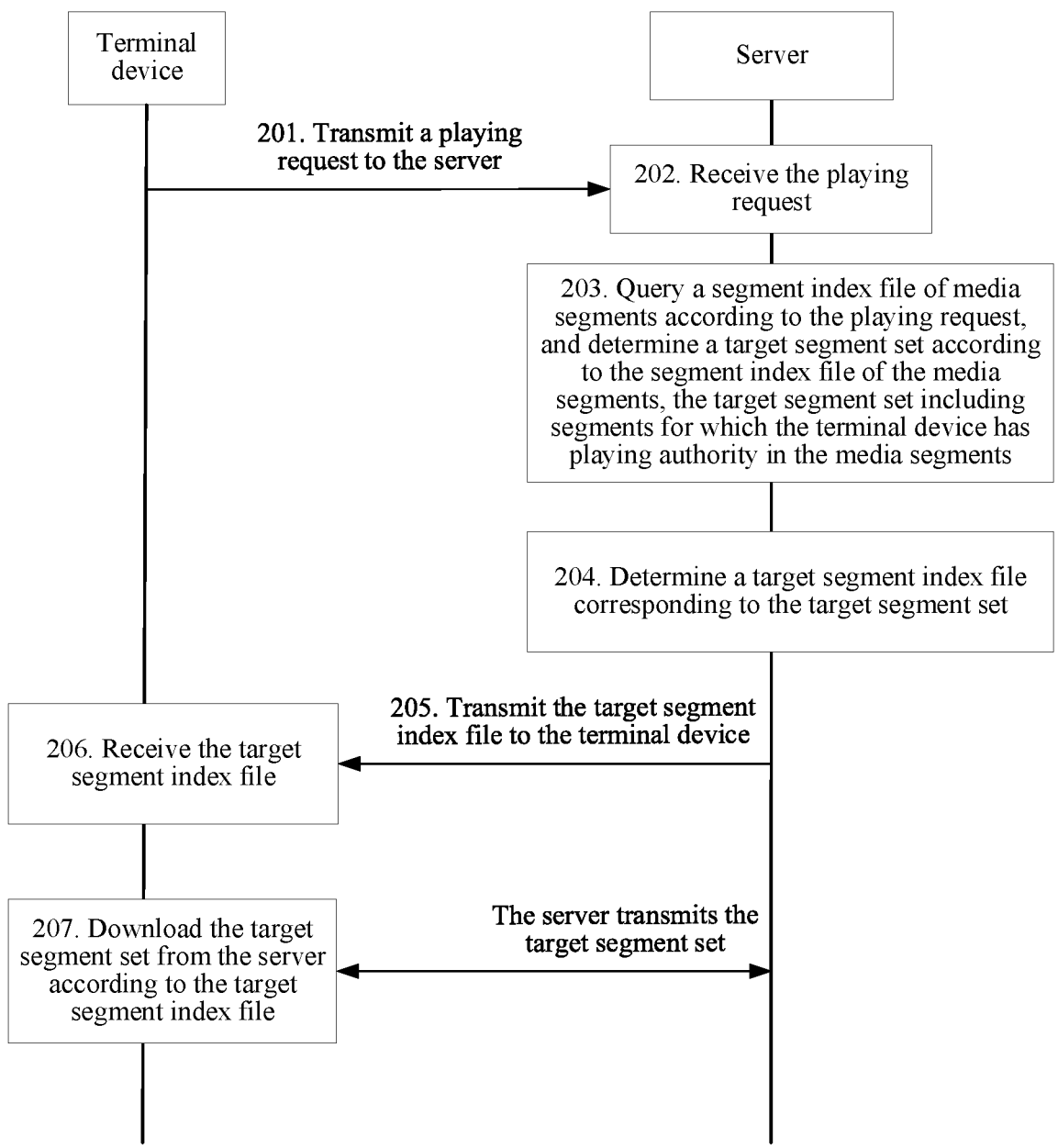
FIG. 2 is a schematic diagram of a method for processing a media segment according to an embodiment of the present application.

Referring to FIG. 2, an example of a media broadcasting method provided in the present application is described below. The method includes the following steps:

201. A terminal device transmits a playing request to a server.

The playing request is configured for requesting to play media segments.

202. The server receives the playing request transmitted by the terminal device.

203. The server queries a segment index file of the media segments according to the playing request, and determines a target segment set according to the segment index file of the media segments.

The target segment set includes segments for which the terminal device has playing authority in the media segments.

204. The server determines a target segment index file corresponding to the target segment set.

In some implementations, the target segment index file may be determined in the following manners:

(1) The target segment index file is acquired according to a current segment index file of the media segments.

For example, the target segment index file may be acquired by editing (for example, deleting or hiding segment index information of the restricted segments) the current segment index file of the media segments.

(2) The target segment index file is dynamically generated according to the target segment set.

(3) A pre-stored segment index file is directly acquired from a storage as the target segment index file.

Specifically, at least the following two mapping relationships can be preset:

a. A mapping relationship among a segment rating, an object rating, and a segment index.

b. A mapping relationship among a segment rating, an object age, and a segment index.

c. A mapping relationship among a segment rating, an object rating, an object age, and a segment index.

The foregoing three mapping relationships may be stored in the form of a list or in another form. A specific manner of presentation is not limited in the present application. The present application only provides the foregoing examples of the mapping relationship. In other implementations, other parameters configured for distinguishing segments or terminal devices may be added to the mapping relationships, or some parameters in the three mapping relationships may be omitted. A specific manner is not limited in the present application.

The server may determine the target segment index file according to a preset mapping relationship and the current segment index file of the media segments. It can be seen in a case of determining the target segment index file in this manner, the terminal device can get a response faster. A management mechanism of media segments can be somewhat optimized by predicting all segment index files corresponding to different cases.

205. The server transmits the target segment index file to the terminal device.

206. The terminal device receives the target segment index file transmitted by the server.

207. The terminal device downloads the target segment set from the server according to the target segment index file.

Compared with a conventional mechanism, in the solution provided in the present application, the server receives a playing request transmitted by the terminal device, queries a segment index file of media segments according to the playing request, then determines a target segment set representing segments for which the terminal device has playing authority in the media segments, and then transmits a target segment index file corresponding to the target segment set to the terminal device to enable the terminal device to download the segments corresponding to segment indexes in a target segment index file. Accordingly, it is not necessary to configure different segments for terminal devices at different ratings, but instead, it is only necessary to dynamically change a segment index file to be transmitted to a terminal device. Only one same set of media segments are needed to provide appropriate media segments to terminal devices having different ratings of playing authority, thereby effectively distinguishing different terminal devices.

Optionally, in some embodiments of the present application, there may be three following cases of determining the target segment set and determining the target segment index file corresponding to the target segment set:

1. The server may use non-restricted segments and restricted segments in the media segments as the target segment set when the media segments to be played requested in the playing request include the restricted segments and it is determined that the terminal device has authority to play the restricted segments.

Next, the server generates the target segment index file according to segment indexes of the non-restricted segments and segment indexes of the restricted segments; or acquires the target segment index file by modifying the current segment index file of the media segments, for example, deleting segment indexes of the restricted segments; or acquires the target segment index file by hiding segment indexes of the restricted segments.

In Case 1, when there is at least one restricted segment, the server may determine the terminal device has authority to play the restricted segments as follows:

The server can acquire various account information of the account when the terminal device has logged in to an account. The account information includes information such as an object name, an object rating, an age, a nationality or address information of a virtual object corresponding to the account. Next, the server may determine, according to segment ratings of the restricted segments and an object rating of the virtual object corresponding to the account, whether at least one restricted segment has a segment rating lower than or equal to the object rating. If yes, the server determines that the terminal device has authority to play the at least one segment.

2. The server may use all the media segments as the target segment set when the media segments include only non-restricted segments. That is, the target segment set can include all the media segments.

Next, the server generates the target segment index file according to segment indexes of all the media segments. That is, the target segment index file can include the segment indexes of all the media segments.

3. The server may use segments other than restricted segments in the media segments as the target segment set when the media segments requested in the playing request include the restricted segments and it is determined that the terminal device does not have authority to play the restricted segments. That is, the target segment set can include the segments other than the restricted segments in the media segments.

Next, the server generates the target segment index file according to segment indexes of the segments other than the restricted segments in the media segments. That is, the target segment index file includes the segment indexes of the segments other than the restricted segments in the media segments.

In Case 3, when the server determines that the terminal device does not have authority to play the restricted segments may be one of the following scenarios:

(a) The server may transmit a login prompt to the terminal device when the terminal device has not logged in to an account, and the server determines that the terminal device currently does not have authority to play the restricted segments when the terminal device has not logged in to the account within a preset time.

For example, the server prompts a visitor user to log in to an account on a playing interface when the visitor user requests to watch media segments including restricted segments. The server determines that the user does not have authority to play any restricted segment in the media segments when the user has not logged in to a valid account within two minutes. In this case, it is only necessary to provide the user with media segments other than restricted segments.

(b) The server may determine that the terminal device does not have authority to play at least one segment having a segment rating lower than or equal to an object rating of a virtual object corresponding to an account when the terminal device has logged in to the account and it is determined according to segment ratings of the restricted segments and the object rating that the at least one segment does not exist in the restricted segments.

For example, the server acquires a rating of an account to which a user has logged in when the user who has logged in to the account requests to watch media segments including restricted segments. It is determined that the user has authority to play all restricted segments in the media segments when the rating of the account is a VIP member. It is determined that the user has authority to play a restricted segment that has a rating lower than or equal to a rating of the normal member in the media segments but does not have authority to play a restricted segment that can only be watched by a VIP member when the rating of the account is a normal member. It is determined that the user has authority to play a non-restricted segment in the media segments but does not have authority to play a restricted segment that can only be watched by a normal member or a VIP member when the rating of the account is a non-member.

(c) It is determined that the terminal device does not have authority to play the restricted segments when the terminal device has logged in to an account and it is determined according to account information corresponding to the logged-in account that an object age of a virtual object is lower than a preset age.

For example, the server acquires account information such as an account rating, a user age or a gender of a rating of an account to which a user has logged in when the user who has logged in to the account requests to watch media segments including restricted segments. The server may determine that the user does not have authority to play any restricted segment that is defined inappropriate for children under 12 in a segment index file regardless of whether the account rating of the user is a normal member, a VIP member or a non-member when the user under 12 years old.

According to the foregoing three cases (a), (b), and (c), authority that the terminal device requesting to play media segments has to play segments with different segment ratings in the media segments can be effectively distinguished. Accordingly, one set of media segments can be used to provide corresponding download services to these different terminal devices.

Optionally, in some embodiments of the present application, before providing a target index file to the terminal device, the server further needs to set segments included in various media segments, especially media segments including restricted segments. Specifically, after acquiring video data to be set, the server can first extract key frames from the video data, and then perform rating analysis on the video data according to the extracted key frames. Next, the server marks video clips in the video data with ratings such as a non-restricted rating and a restricted rating according to results of the analysis. The ratings are marked to define playing restrictions for determining whether the video clips can be played.

Next, the server transcodes these video clips and splits the video data according to the ratings of the video clips after finishing transcoding. The video data may be split into the media segments including at least two segments. A segment rating of a segment corresponds to a rating of a video clip. That is, each segment has a segment rating. Different segments can have the same rating or different ratings.

After a segment rating is set for each segment, the server writes segment ratings of the segments in the media segments into an initial segment index file. Accordingly, when the server responds to a playing request of a terminal device subsequently, the server may dynamically provide an appropriate target segment index file to the terminal device based on the initial segment index file. Accordingly, corresponding target segment sets may be provided to different types of terminal devices based on only the data resource of only one set of media segments, thereby effectively distinguishing different types of terminal devices. It is not necessary to store a plurality of media files in different categories to provide corresponding services to different types of terminal devices. Compared with a conventional mechanism, the storage pressure of servers can be significantly reduced.

Optionally, in some embodiments of the present application, after the server marks the video clips in the video data with ratings according to the results of the analysis and before the video data is transcoded, the method further includes:

encrypting segment ratings of restricted segments corresponding to a restricted video clip when it is determined according to the results of the analysis that the video data includes the restricted video clip.

Optionally, in some embodiments of the present application, users may watch a video and make some personal comments on content played in the video, and especially, many users may comment on the video. According to big data analysis, the users will contribute to somewhat objective general comments on the video. In this case, the server can further feed each video into a video comment system and then dynamically update a current segment index file of media segments based on comments of users on the media segments.

Specifically, after downloading the target segment set from the server according to the target segment index file, the terminal device may further acquire comments on at least one segment in the target segment set that are made by users in a case of playing the segments in the target segment set, and transmit the comments on the at least one segment in the target segment set to the server, so that after acquiring the comments on the segments in the media segments, the server can determine real-time segment ratings of the segments in the media segments according to comments on the segments in the media segments from the terminal device and segment ratings of the segments in the media segments, and then update a current segment index file of the media segments according to the real-time segment ratings of the segments in the media segments.

It can be learned that the server updates the current segment index file of the media segments by synchronizing related comments on the video. Comments of users can be divided into many categories. The server determines characteristics of the video according to categories with a relatively large quantity of comments, so as to determine restricted ratings that the video is supposed to meet. Accordingly, the server can further update (for example, add, modify, or delete index information in the segment index file) segment index files corresponding to various restricted ratings, thereby achieving much higher efficiency than that of manually reviewing segment index files by a backend administrator and acquiring segment index files with as little subjectivity as possible. Accordingly, an administrator that reviews videos can determine restricted ratings more genuinely and accurately. Rating information of a video is clearer, more objective, and more accurate when the video is described more by users.

For example, a rating of each segment is generally rated according to subjective impression or predefined rating rules as a general rating, a protected rating, a guidance rating, and a restricted rating when the administrator rates the rating of each segment corresponding to the video on a server side. However, after watching these segments, users will make comments on the segments based on actual watching experience. A massive quantity of users watch videos. Therefore, an actual rating of a same segment approaches one rating more clearly when users make more comments on the segment, and comments become increasingly objective. Therefore, after these users make comments on the segments, the administrator can make dynamical adjustments to locally stored segments according to the comments on the segments collected and analyzed on the server side. Accordingly, rated playing can be more accurate and more objective. For example, the administrator originally rates a segment as a protected rating. After a user comment mechanism is introduced, the rating of the segment may be eventually adjusted to a restricted rating or a general rating.

For another example, the server acquires comments made by users on segments in real time, then dynamically calculates segment ratings of the segments based on the Bayes formula, and feeds back the calculated segment ratings to the administrator. The administrator then can dynamically adjust locally stored segments according to the comments on the segments collected and analyzed on the server side. Accordingly, rated playing can be more accurate and more objective. For example, the administrator originally rates a segment as a protected rating. After a user comment mechanism is introduced, the rating of the segment may be eventually adjusted to a restricted rating or a general rating. An algorithm for calculating a segment rating of a segment is not limited in the present application, provided that a calculated segment rating can be as objective as possible.

In some implementations, after dynamically calculating segment ratings of segments based on the Bayes formula, the server can determine a segment whose segment rating can be updated. The server then automatically updates a segment rating of a locally stored segment.

Figure 3:
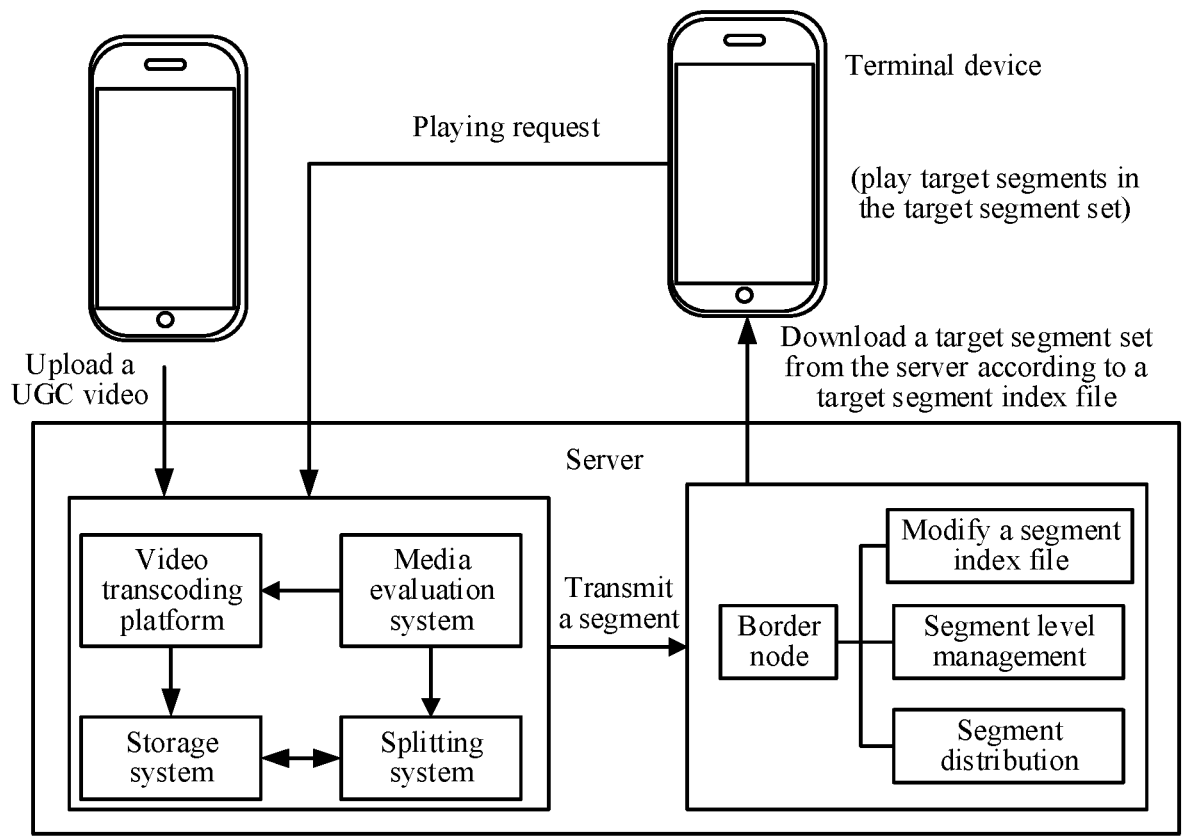
FIG. 3 is a logic block diagram of a server according to an embodiment of the present application.

For ease of understanding, the solution of processing media segments in the present application is described below by using rated video transmission. As shown in FIG. 3, the server includes a media evaluation system, a storage system, a video transcoding platform, a splitting system, and a border node (BN). After the administrator uploads a user generated content (UGC) video to the storage system, the media evaluation system analyzes the UGC video. Specifically, key frames are first captured from the UGC video. The key frames are then analyzed. The UGC video is then marked according to the video content of the UGC video. For example, a blood score is 8, and a violence score is 10. A condition for a restricted segment may be set as follows: A video clip having a blood score greater than 8, a violence score greater than 7 or the like may be considered as a restricted part. A condition for a non-restricted clip may be set as follows. A video clip having a blood score less than 8, a violence score less than 7 or the like may be considered as a non-restricted clip.

Next, the media evaluation system analyzes the UGC video to find a video clip having a blood score greater than 8 and a video clip having a violence score greater than 7, records indexes of such video clips whose blood score or violence score meets a restriction condition, and cuts these restricted clips. When the UGC video is a popular video, the UGC video may further be manually reviewed to mark different video clips in the UGC video with related ratings. The ratings of the video clips can be recorded in a media description file in the media evaluation system.

After the cutting, the cut versions of the UGC video are fed into the video transcoding platform, and the cut versions of the UGC video are converted into videos with different bit rates. For example, the UGC video is converted into a standard-definition video, a high-definition video, an ultra-high-definition video, a Blu-ray video or the like according to an original bit rate of the UGC video, to provide users with varied video resource options.

After the UGC video is transcoded, transcoded UGC videos with different bit rates are fed into the splitting system. The splitting system splits the UGC videos with different bit rates according to the segment index file (also referred to as the media description file) in the media evaluation system. After the splitting, the UGC video of each bit rate is split into a plurality of transport stream (TS) segments. The splitting system then writes rating information of each segment into the segment index file. The segment index file in the present application can be an m3u8 file or another type of file. A specific type is not limited in the present application. A TS is a bitstream based on a communication protocol adopted for audio and video signals and data, and is mainly applied to real-time transmission of digital television broadcast programs. A TS includes one or more programs. Each program is formed by one or more original streams combined with some other streams including a video stream, an audio stream, a program special information stream and other packets. There are four types of tables for the program special information stream: a program association table, a program mapping table, a network information table, and a conditional access table. The TS may be applied to video/audio data storage and nonlinear editing systems of television programs and networks thereof.

For example, a current m3u8 index file of a UGC video stored on the server may include the following information:
EXTM3U
EXT-X-VERSION: 3
EXT-X-MEDIA-SEQUENCE: 0
EXT-X-TARGETDURATION: 3
EXT-X-PLAYLIST-TYPE: VOD
EXTINF: 2.060,
00_rand.ts?rating=0
EXTINF: 2.960,
01_rand.ts?rating=2
EXTINF: 2.960,
02_rand.ts?rating=0
. . .

EXTINF: 2.960,
On_rand.ts?rating=10

The current m3u8 index file on the server side may include a version of a UGC video and the playing duration and rating information of each TS segment in the UGC video. For example, the rating information is rating descriptions of TS segments shown in Table 1 below:

TABLE 1

| Rating | Description |
| --- | --- |
| 0 | General rating, appropriate for general audiences |
| 1 | Protected rating, including violent content, inappropriate for children under 6 |
| 2 | Guidance rating, including bloody content, inappropriate for children under 12 |
| 3 | Restricted rating, inappropriate for children under 18 |
| ... | ... |
| 10 | Prohibited rating, viewing prohibited |

For example, 00_rand.ts represents a first TS segment in the UGC video, 01_rand.ts represents a second TS segment in the UGC video, and the rest is similar and is not repeated herein. Rating=0 represents a non-restricted segment, a row with rating=2 corresponds to "01_rand.ts" in the new m3u8 file in the embodiment corresponding to FIG. 4 and means that children prohibited from viewing the TS segment, and rating=10 represents that members are prohibited from viewing.

After the splitting, the splitting system distributes TS segments to the BN, which is a logical node in a particular peer group. The logical node has at least one link through the peer group boundary, mainly for connecting to the user side.

After media distribution, the UGC video starts to be posted. Refer to the foregoing description of the UGC video for the setting and distribution of other videos. Users can browse and watch related videos.

When a user watches a non-restricted video, the server transmits all m3u8 indexes of the video to a client. After receiving m3u8, the client can start to download related TS segments. The server makes no modification to m3u8, and therefore the user can watch the complete video.

Figure 4:
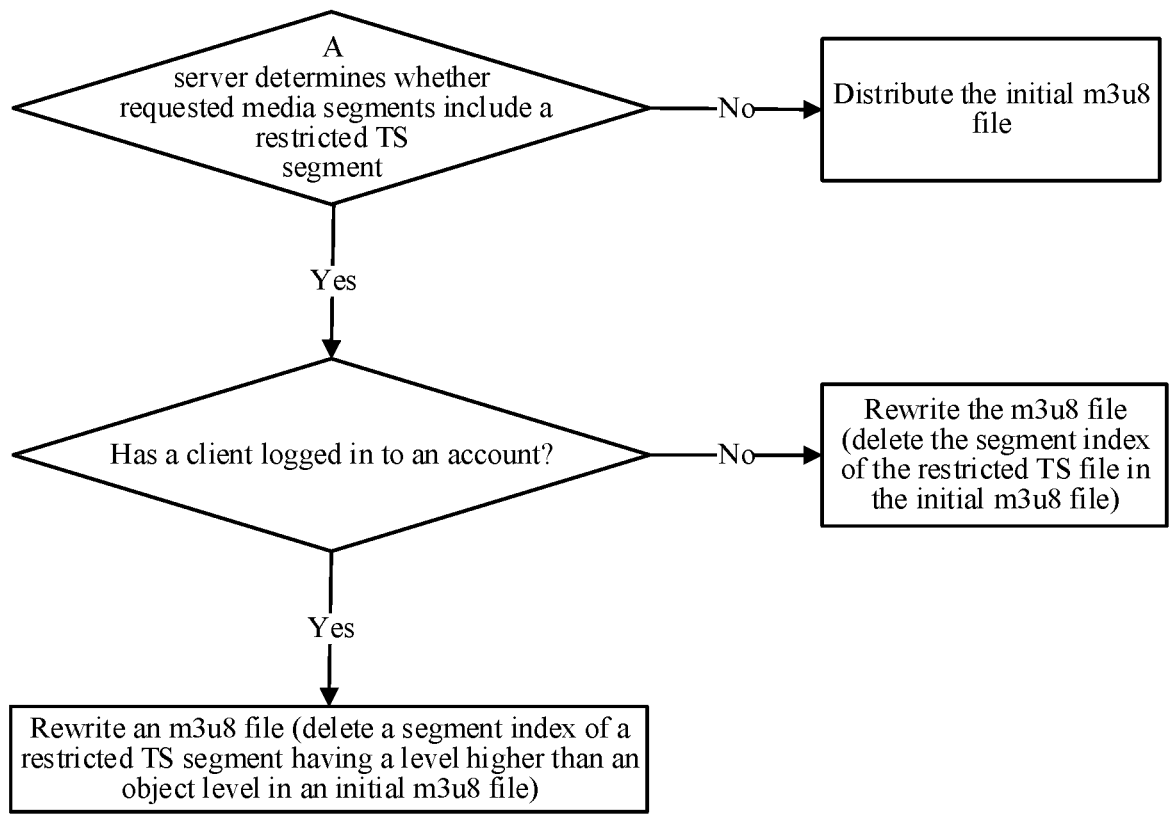
FIG. 4 is a schematic flowchart of a method for processing a media segment according to an embodiment of the present application.

The watching of the UGC video is used as an example below. FIG. 4 is a flowchart of processing a request from a client by a server. When a user requests to download the UGC video, the server determines that the UGC video that the user requests to download includes restricted information (referring to Table 1). The server prompts the user to log in to an account when the user has not logged in to the account. The server rewrites segment index information of non-restricted TS segments in the initial m3u8 file into a new m3u8 file when the user does not log in, and then distributes the new m3u8 file to the client. Accordingly, the new m3u8 file acquired by the client does not include the segment index information of the restricted TS segment, so that the user can only watch the non-restricted TS segments. However, the UGC video is smoothly played for the client, and the restricted TS segment is not displayed. The absence of the restricted TS segment is not perceptible on the client.

After the user has logged in to the account, the server further determines an age or a user rating of the user, and rewrites an m3u8 file according to the age or the user rating of the user. The server filters out index information of TS segments with a rating higher than the user rating, and then transmits the rewritten m3u8 file to the client to enable the client to download corresponding TS segments according to the received m3u8 file. In some implementations, a table may be preset to rewrite m3u8 indexes in real time. The table may include a mapping relationship among a user rating, an age group, and index information of a TS segment, or may directly include an m3u8 file in which a user rating, an age group, and index information of a TS segment are directly mapped to a corresponding user rating or age group. TS segments that the user can download are determined according to the user rating or the age group. A corresponding m3u8 file is then located according to the table. The pre-stored m3u8 file is then transmitted to the client, so that the server can respond to a playing request of the client faster.

For example, when the server determines that the current user requesting the UGC video is 10 years old, it is determined that the user does not have authority to play a TS segment of rating=2. In this case, the server can delete index information of a TS segment of rating=2 in the current m3u8 file to form a new m3u8 file. The new m3u8 file may include the following information:

EXTM3U
EXT-X-VERSION: 3
EXT-X-MEDIA-SEQUENCE: 0
EXT-X-TARGETDURATION: 3
EXT-X-PLAYLIST-TYPE: VOD
EXTINF: 2.060,
00_rand.ts?rating=0
EXTINF: 2.960,
02_rand.ts?rating=0
. . .
EXTINF: 2.960,
On_rand.ts?rating=10

The new m3u8 file is then transmitted to the user, so that TS segments downloaded by the user do not include the TS segment of rating=2.

It can be seen from the foregoing that the present application can meet the watching demands of different users based on a single set of video storage. It is not necessary to store different video resources for different groups of users, which can somewhat reduce the load of servers and optimize a video management mechanism, and the client may get a response faster.

In some implementations, users may watch a video and make some personal comments on content played in the video, and especially, many users may comment on the video. According to big data analysis, the users will contribute to somewhat objective general comments on the video. In this case, the server can further feed each video into a video comment system. When a video is described more by users, rating information of the video is clearer, more objective, and more accurate. The server can update the m3u8 indexes by synchronizing related comments on the video. Comments of users can be divided into many categories. The server determines characteristics of the video according to categories with a relatively large quantity of comments, so as to determine restricted ratings that the video is supposed to meet. Accordingly, the server can further update (for example, add, modify, or delete index information in the m3u8 file) m3u8 files corresponding to various restricted ratings, thereby achieving much higher efficiency than that of manually reviewing m3u8 files by a backend administrator and acquiring m3u8 files with as little subjectivity as possible. Accordingly, an administrator that reviews videos can determine restricted ratings more genuinely and accurately.

The foregoing describes a media broadcasting method in the present application and the following separately describes a server and a terminal device that perform the foregoing media broadcasting method.

Figure 5:
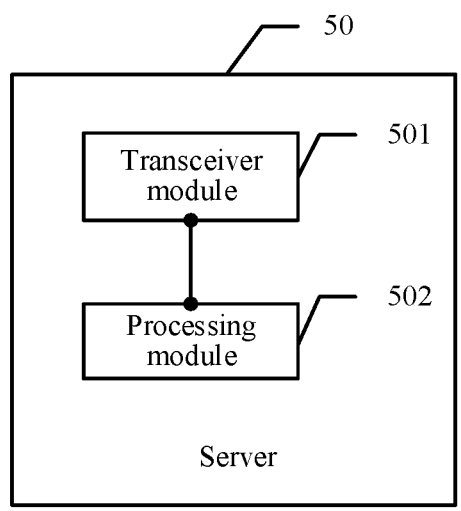
FIG. 5 is a block diagram of a server according to an embodiment of the present application.

1. Referring to FIG. 5, a server 50 is described. The server 50 includes: a transceiver module 501, configured to receive a playing request transmitted by a terminal device, the playing request being configured for requesting to play media segments; and a processing module 502, configured to: query a segment index file of the media segments according to the playing request, and determine a target segment set according to the segment index file of the media segments, where the target segment set includes segments for which the terminal device has playing authority in the media segments; determine a target segment index file corresponding to the target segment set; and transmit the target segment index file to the terminal device through the transceiver module 501.

In this embodiment of the present application, the processing module 502 determines, at the transceiver module 501, a target segment set representing segments for which the terminal device has playing authority in the media segments, transmits a target segment index file corresponding to the target segment set to the terminal device to enable the terminal device to download the segments corresponding to segment indexes in a target segment index file. Accordingly, it is not necessary to configure different segments for terminal devices at different ratings, but instead, it is only necessary to dynamically change a segment index file to be transmitted to a terminal device. Only one same set of media segments are needed to provide appropriate media segments to terminal devices having different ratings of playing authority, thereby effectively distinguishing different terminal devices.

Optionally, the processing module 502 is at least specifically configured to perform one of the following solutions: using non-restricted segments and restricted segments in the media segments as the target segment set when the media segments to be played requested in the playing request include the restricted segments and it is determined that the terminal device has authority to play the restricted segments, and generating the target segment index file according to segment indexes of the non-restricted segments and segment indexes of the restricted segments; or using segments other than restricted segments in the media segments as the target segment set when the media segments requested in the playing request include the restricted segments and it is determined that the terminal device does not have authority to play the restricted segments, and generating the target segment index file according to segment indexes of the segments other than the restricted segments in the media segments.

Optionally, the processing module 502 is specifically configured to: determine that the terminal device has authority to play at least one segment having a segment rating lower than or equal to an object rating of a virtual object corresponding to an account when the terminal device has logged in to the account and it is determined according to segment ratings of the restricted segments and the object rating that the at least one segment exists in the restricted segments.

Optionally, the processing module 502 is specifically configured to: use all the media segments as the target segment set when the media segments include only non-restricted segments; and generate the target segment index file according to segment indexes of all the media segments.

Optionally, the processing module 502 is specifically configured to perform one of the following operations: transmitting a login prompt to the terminal device when the terminal device has not logged in to an account, and determining that the terminal device currently does not have authority to play the restricted segments when the terminal device has not logged in to the account within a preset time; or determining, by the server, that the terminal device does not have authority to play at least one segment having a segment rating lower than or equal to an object rating of a virtual object corresponding to an account when the terminal device has logged in to the account and it is determined according to segment ratings of the restricted segments and the object rating that the at least one segment does not exist in the restricted segments; or determining that the terminal device does not have authority to play the restricted segments when the terminal device has logged in to an account and it is determined according to account information corresponding to the logged-in account that an object age of a virtual object is lower than a preset age.

Optionally, before determining the target segment set, the processing module 502 is further configured to: acquire video data, and perform rating analysis on the video data according to key frames in the video data; mark video clips in the video data with ratings according to results of the analysis; split the video data according to the ratings of the video clips after the video data is transcoded, the media segments including at least two segments that can be acquired after the splitting, and a segment rating of the segment corresponding to the rating of the video clip; and write segment ratings of the segments in the media segments into an initial segment index file.

Optionally, the processing module 502 is specifically configured to: determine the target segment index file according to a preset mapping relationship and a current segment index file of the media segments, where the mapping relationship includes a mapping relationship among a segment rating, an object rating, and a segment index or a mapping relationship among a segment rating, an object rating, an object age, and a segment index.

Optionally, after marking the video clips in the video data with ratings according to the results of the analysis and transcoding the video data, the processing module 502 is further configured to: encrypt segment ratings of restricted segments corresponding to a restricted video clip when it is determined according to the results of the analysis that the video data includes the restricted video clip.

Optionally, before determining that the terminal device has authority to play the restricted segments, the processing module 502 is further configured to: acquire comments on the segments in the media segments; determine real-time segment ratings of the segments in the media segments according to segment ratings of the segments in the media segments and the comments on the segments in the media segments; and update a current segment index file of the media segments according to the real-time segment ratings of the segments in the media segments.

All or some of the modules included in the server 50 may be implemented by software, hardware, or a combination thereof.

Figure 6:
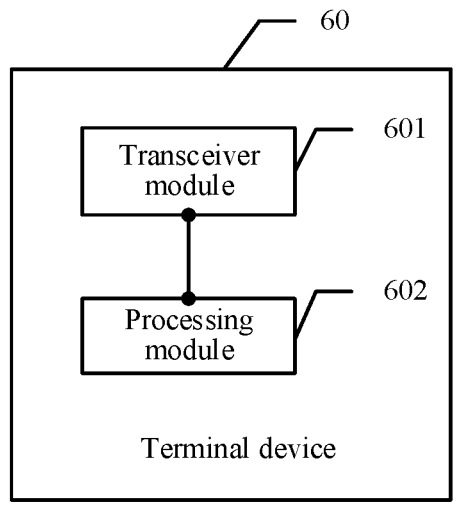
FIG. 6 is a block diagram of a terminal device according to an embodiment of the present application.

2. Referring to FIG. 6, a terminal device 60 is described. The terminal device 60 includes: a transceiver module 601, configured to transmit a playing request to a server, the playing request being configured for requesting to play media segments, the transceiver module 601 being further configured to receive a target segment index file transmitted by the server, the target segment index file including segment indexes of segments in a target segment set, the target segment set being a segment set determined after the server queries a segment index file of the media segments according to the playing request, and the target segment set including segments for which the terminal device has playing authority in the media segments; and a processing module 602, configured to download the target segment set from the server according to the target segment index file received by the transceiver module 601.

In this embodiment of the present application, the transceiver module 601 transmits a playing request to the server, so that the server determines a target segment set including segments for which the terminal device has playing authority in media segments. After the transceiver module 601 receives a target segment index file of the segments for which the terminal device has playing authority, the processing module 602 can download the target segment set according to the target segment index file. Accordingly, it is not necessary to configure different segments for terminal devices at different ratings, but instead, it is only necessary to dynamically change a segment index file to be transmitted to a terminal device by the server. Different types of terminal devices can only acquire media segments for which the terminal devices have playing authority.

Optionally, the target segment index file includes segment indexes of non-restricted segments and segment indexes of restricted segments in the media segments when the media segments include the restricted segments, and the target segment set includes the non-restricted segments and the restricted segments; and/or the target segment index file includes segment indexes of segments other than restricted segments in the media segments when the media segments include the restricted segments, and the target segment set includes the segments other than the restricted segments in the media segments.

Optionally, the target segment index file includes segment indexes of non-restricted segments and segment indexes of restricted segments in the media segments when there is at least one restricted segment, and the target segment set includes the non-restricted segments and the at least one segment with a segment rating lower than or equal to an object rating in the restricted segments, where the object rating is a rating of a virtual object corresponding to the account to which the terminal device has logged in.

Optionally, the target segment index file includes segment indexes of all the media segments when the media segments include only non-restricted segments, and the target segment set includes all the media segments.

Optionally, the target segment index file includes segment indexes of segments other than restricted segments in the media segments when the media segments include the restricted segments, and the target segment set includes the segments other than the restricted segments in the media segments.

Optionally, the processing module 602 is further configured to: acquire comments on at least one segment in the target segment set that are made by users in a case of playing the segments in the target segment set, and transmit the comments on the at least one segment in the target segment set to the server, so that the server determines real-time segment ratings of the segments in the media segments according to comments on the segments in the media segments from the terminal device and segment ratings of the segments in the media segments, and updates a current segment index file of the media segments according to the real-time segment ratings of the segments in the media segments.

All or some of the modules included in the terminal device 60 may be implemented by software, hardware, or a combination thereof.

The server and the terminal device in the embodiments of the present application are described above from the perspective of modular functional entities. The server and the terminal device in the embodiments of the present application are described below from the perspective of hardware processing. In the embodiment shown in FIG. 5 of the present application, a physical device corresponding to the transceiver module may be a transceiver or an input/output unit, and a physical device corresponding to the processing module may be a processor. The apparatus shown in FIG. 5 may have a structure shown in FIG. 7. When the apparatus shown in FIG. 5 has the structure shown in FIG. 7, a processor, a transmitter, and a receiver in FIG. 7 can implement the same or similar functions of the foregoing processing module and transceiver module provided in the foregoing apparatus embodiment corresponding to the apparatus, and a central memory in FIG. 7 stores a program code that needs to be invoked by the processor to perform the foregoing media broadcasting method.

In the embodiment shown in FIG. 6 of the present application, a physical device corresponding to the transceiver module may be an input/output interface, and a physical device corresponding to the processing module may be a processor. The apparatus shown in FIG. 6 may have a structure shown in FIG. 8. When the apparatus shown in FIG. 6 has the structure shown in FIG. 8, a processor and a radio frequency (RF) circuit in FIG. 8 can implement the same or similar functions of the foregoing processing module, transmission module, and receiving module provided in the foregoing apparatus embodiment corresponding to the apparatus, and a memory in FIG. 8 stores a program code that needs to be invoked by the processor to perform the foregoing media broadcasting method.

Figure 7:
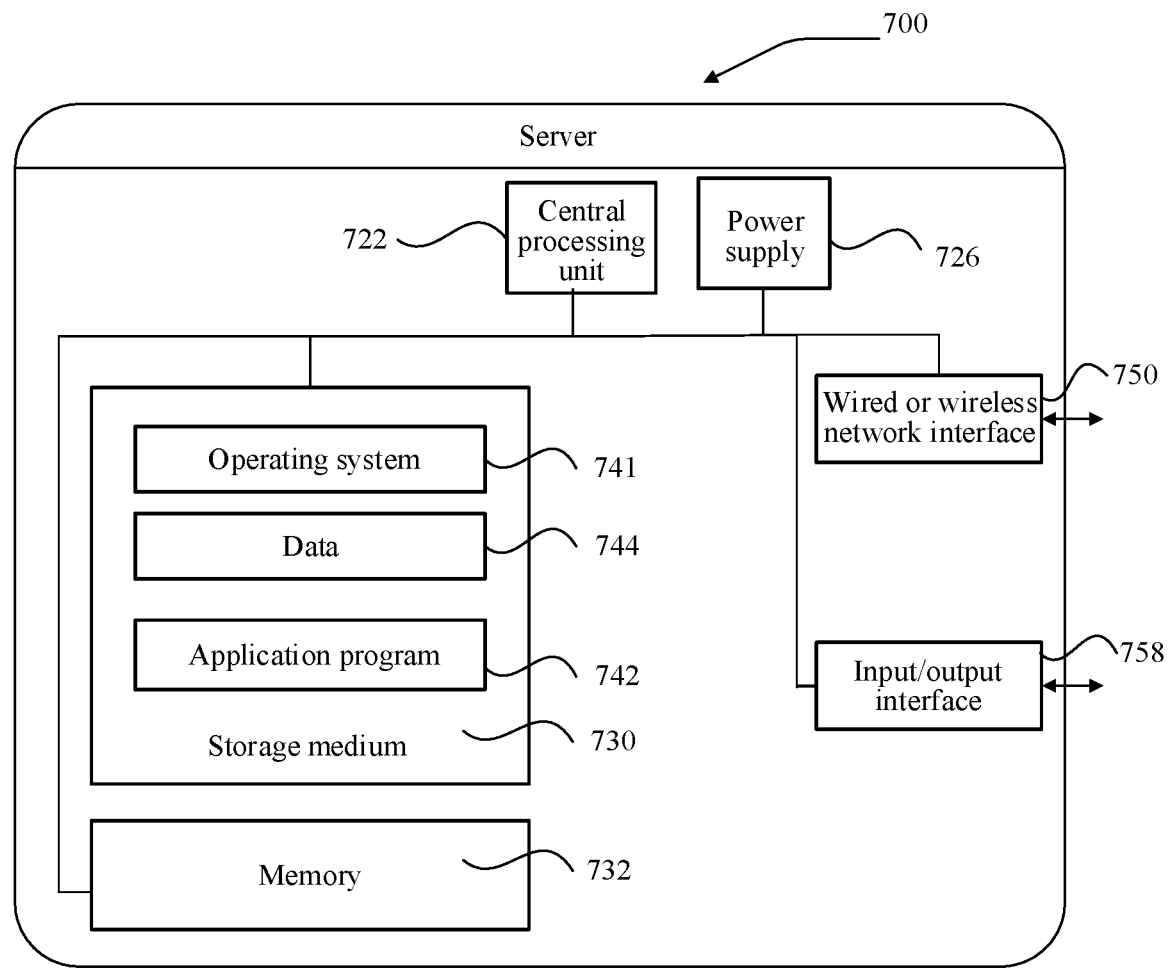
FIG. 7 is another block diagram of a server according to an embodiment of the present application.

FIG. 7 is a block diagram of a server according to an embodiment of the present application. A server 700 may vary greatly due to different configurations or performance, and may include one or more central processing units (CPU) 722 (for example, one or more processors), a memory 732, and one or more storage media 730 (for example, one or more mass storage devices) that store an application program 742 or data 744. The memory 732 and the storage medium 730 may be transient storage or persistent storage. The program stored in the storage medium 730 may include one or more modules (not shown), and each module may include a series of computer-readable instructions for the server. Further, the CPU 722 may be configured to communicate with the storage medium 730, and execute, on the server 700, the series of computer-readable instructions stored in the storage medium 730. The computer-readable instructions are executed to enable one or more processors included in the CPU 722 to perform a media broadcasting method. The storage medium 730 may be a non-volatile storage medium. The non-volatile storage medium may be a non-volatile readable storage medium.

The server 700 may further include one or more power supplies 726, one or more wired or wireless network interfaces 750, one or more input/output interfaces 758, and/or one or more operating systems 741 such as Windows Server™, Mac OS X™, Unix™, Linux$^T$, FreeBSD™ or the like.

The operations performed by the server in the foregoing embodiment may be based on the server structure shown in FIG. 7.

Figure 8:
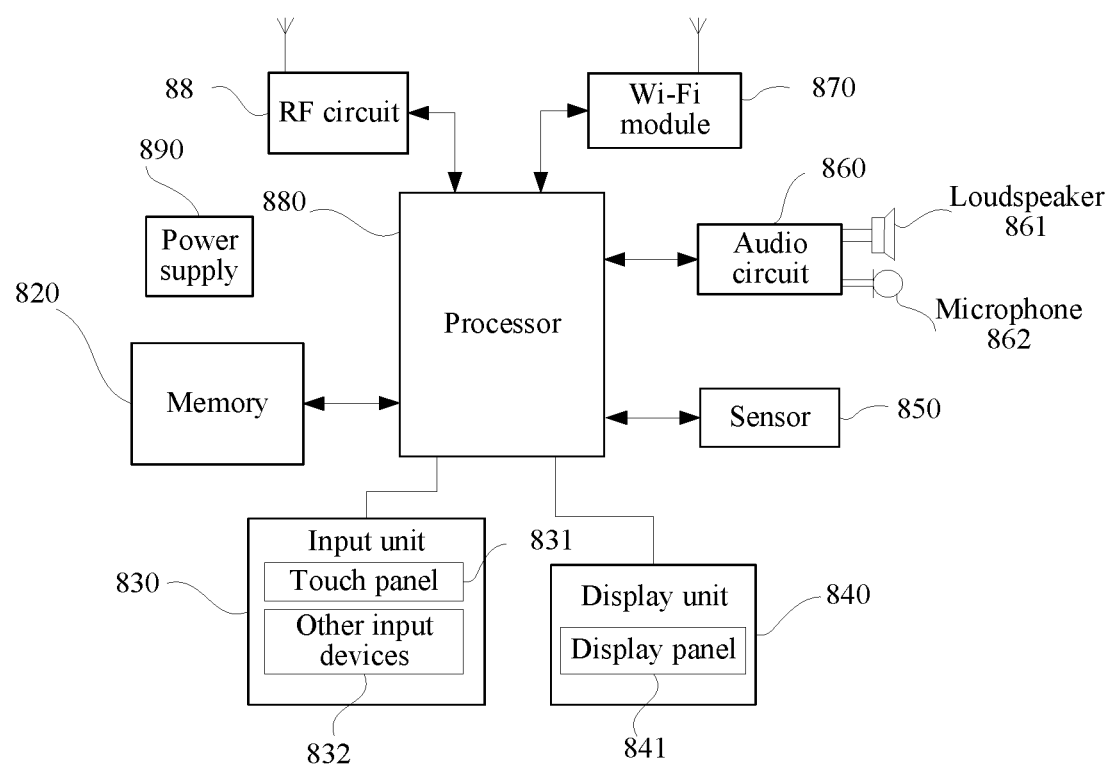
FIG. 8 is a block diagram of a mobile phone according to an embodiment of the present application.

An embodiment of the present application further provides a terminal device. As shown in FIG. 8, for ease of description, only parts related to the embodiments of the present application are shown. For specific technical details that are not disclosed, refer to the method part of the embodiments of the present application. The terminal device may include any terminal device such as a mobile phone, a tablet computer, a personal digital assistant (PDA), a point of sales (POS), or a vehicle-mounted computer. An example in which the terminal is a mobile phone is used:

FIG. 8 is a block diagram of a partial structure of a mobile phone related to a terminal device according to an embodiment of the present application. Referring to FIG. 8, the mobile phone includes components such as an RF circuit 88, a memory 820, an input unit 830, a display unit 840, a sensor 850, an audio circuit 860, a wireless fidelity (Wi-Fi) module 870, a processor 880, and a power supply 890. A person skilled in the art may understand that the structure of the mobile phone shown in FIG. 8 does not constitute a limitation on the mobile phone, and the mobile phone may include more components or fewer components than those shown in the figure, or some components may be combined, or a different component deployment may be configured.

The components of the mobile phone are described below in detail with reference to FIG. 8.

The RF circuit 88 may be configured to receive and send signals during an information receiving and sending process or a call process. Specifically, the RF circuit 88 receives downlink information from a base station, then delivers the downlink information to the processor 880 for processing, and sends designed uplink data to the base station. Usually, the RF circuit 88 includes, but is not limited to, an antenna, at least one amplifier, a transceiver, a coupler, a low noise amplifier (LNA), and a duplexer. In addition, the RF circuit 88 may also communicate with a network and another device by wireless communication. The wireless communication may use any communications standard or protocol, which includes, but is not limited to, Global System for Mobile communications (GSM), general packet radio service (GPRS), code division multiple access (CDMA), wideband code division multiple access (WCDMA), long term evolution (LTE), email, short messaging service (SMS), and the like.

The memory 820 may be configured to store a software program and module. The processor 880 runs the software program and module stored in the memory 820, to perform various functional applications and data processing of the mobile phone. The memory 820 may mainly include a program storage area and a data storage area. The program storage area may store an operating system, an application program required by at least one function (such as a sound playing function and an image display function), and the like. The data storage area may store data (such as audio data and an address book) created according to the use of the mobile phone, and the like. In addition, the memory 820 may include a high speed random access memory, and may also include a non-volatile memory, such as at least one magnetic disk storage device, a flash memory, or another volatile solid storage device. The mobile phone (that is, a terminal device) may include a non-volatile storage medium. The non-volatile storage medium stores computer-readable instructions. The computer-readable instructions can be executed by one or more processors. The computer-readable instructions are executed by the one or more processors to enable the one or more processors to perform a media broadcasting method.

The input unit 830 may be configured to receive input digit or character information, and generate a keyboard signal input related to the user setting and function control of the mobile phone. Specifically, the input unit 830 may include a touch panel 831 and other devices 832. The touch panel 831 may also be referred to as a touchscreen, and may collect a touch operation of a user on or near the touch panel (such as an operation of a user on or near the touch panel 831 by using any suitable object or attachment, such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transfers the touch point coordinates to the processor 880. Moreover, the touch controller can receive and execute a command transmitted by the processor 880. In addition, the touch panel 831 may be a resistive, capacitive, infrared, or surface sound wave type touch panel. In addition to the touch panel 831, the input unit 830 may further include another input device 832. Specifically, the other input devices 832 may include, but is not limited to, one or more of a physical keyboard, a functional key (such as a volume control key or a switch key), a track ball, a mouse, and a joystick.

The display unit 840 may be configured to display information input by the user or information provided for the user, and various menus of the mobile phone. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 831 transfers the touch operation to the processor 880, so as to determine the type of the touch event. Next, the processor 880 provides a corresponding visual output on the display panel 841 according to the type of the touch event. Although in FIG. 8, the touch panel 831 and the display panel 841 are configured as two individual components to implement input and output functions of the mobile phone, in some embodiments, the touch panel 831 and the display panel 841 may be integrated to implement the input and output functions of the mobile phone.

The mobile phone may further include at least one sensor 850 such as an optical sensor, a motion sensor, and other sensors. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 860, a loudspeaker 861, and a microphone 862 may provide audio interfaces between the user and the mobile phone. The audio circuit 860 may convert received audio data into an electric signal and transmit the electric signal to the loudspeaker 861. The loudspeaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Next, the processor 880 transmits the audio data to, for example, another mobile phone by using the RF circuit 88, or outputs the audio data to the memory 820 for further processing.

Wi-Fi belongs to a short distance wireless transmission technology. The mobile phone may help, by using the Wi-Fi module 870, a user to receive and send an email, browse a web page, access stream media, and the like. This provides wireless broadband Internet access for the user. Although FIG. 8 shows the Wi-Fi module 870, it may be understood that the Wi-Fi module 870 is not an indispensable component of the mobile phone, and when required, the Wi-Fi module 870 may be omitted as long as the scope of the essence of the present application is not changed.

The processor 880 is the control center of the mobile phone, and is connected to various parts of the mobile phone by using various interfaces and lines. By running or executing the software program and/or module stored in the memory 820, and invoking data stored in the memory 820, the processor 880 implements various functions and data processing of the mobile phone, thereby performing overall monitoring on the mobile phone. Optionally, the processor 880 may include one or more processing units. Preferably, the processor 880 may integrate an application processor and a modem. The application processor mainly processes an operating system, a user interface, an application program, and the like. The modem mainly processes wireless communication. It may be understood that the foregoing modem may either not be integrated into the processor 880.

The mobile phone further includes the power supply 890 (such as a battery) for supplying power to the components. Preferably, the power supply may be logically connected to the processor 880 by using a power management system, thereby implementing functions such as charging, discharging, and power consumption management by using the power management system.

Although not shown in the figure, the mobile phone may further include a camera, a Bluetooth module, and the like, which are not further described herein.

In the embodiment of the present application, the processor 880 included in the terminal further controls and performs a method and a procedure performed by the terminal.

In the foregoing embodiments, description of each embodiment focuses on a different part, and for parts that are not described in detail in one embodiment, reference may be made to the related description in other embodiments.

A person skilled in the art may clearly understand that, for simple and clear description, for specific work processes of the foregoing described system, apparatus, and module, reference may be made to corresponding process in the foregoing method embodiments, and details are not described herein again.

In the several embodiments provided in the present application, it is to be understood that the disclosed system, apparatus, and method may be implemented in other manners. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network modules. Some or all of modules may be selected to achieve the objective of the embodiment solutions according to an actual need.

In addition, functional modules in the embodiments of the present application may be integrated into one processing module, or each of the modules may exist alone physically, or two or more modules are integrated into one module. The integrated module may be implemented in a hardware form, or may be implemented in the form of a software functional module. If implemented in the form of software functional modules and sold or configured as an independent product, the integrated modules may be stored in a computer-readable storage medium.

All or some of the foregoing embodiments may be implemented by using software, hardware, firmware, or any combination thereof. When software is configured for implementation, implementation may be entirely or partially performed in the form of a computer program product.

The computer program product includes one or more computer instructions. When the computer program instructions are loaded and executed on a computer, all or some of the processes or functions according to the embodiments of the present application are produced. The computer may be a general-purpose computer, a dedicated computer, a computer network, or another programmable apparatus. The computer-readable instructions may be stored in a computer-readable storage medium or may be transmitted from a computer-readable storage medium to another computer-readable storage medium. For example, the computer-readable instructions may be transmitted from a website, a computer, a server, or a data center to another website, computer, server, or data center in a wired (such as a coaxial cable, a fiber, or a digital subscriber line (DSL)) or wireless (such as infrared, wireless, or microwave) manner. The computer-readable storage medium may be any usable medium accessible by the computer, or a data storage device, such as a server or a data center, including one or more usable media. The usable medium may be a magnetic medium (for example, a soft disk, a hard disk, or a magnetic tape), an optical medium (for example, a DVD), a semiconductor medium (for example, a solid state disk (SSD)), or the like.

The technical solutions provided in the present application are described in detail above. The principle and implementations of the present application are described herein by using specific examples. The descriptions of the foregoing embodiments are merely configured for helping understand the method and core ideas of the present application. In addition, a person skilled in the art can make variations to the present application in terms of the specific implementations and application scopes according to the ideas of the present application. Therefore, the content of this specification shall not be construed as a limit on the present application.

What is claimed is:

1. A media broadcasting method implemented by a server, comprising:

storing, in the server, only a single initial segment index file of media segments that lists all segments with corresponding restriction information, the restriction information indicating at least one of whether the corresponding segment is a restricted segment or a rating of the corresponding segment;

receiving a playing request transmitted by a terminal device, the playing request requesting to play media segments;

upon receiving the playing request, determining whether the terminal device is restricted to play a segment in the media segments;

in response to the terminal device being restricted to one or more segments, rewriting, in real time, the initial segment index file into a target segment index file by deleting, from the initial segment index file, segment index information of the one or more segments that the terminal device does not have authority to play;

in response to the terminal device being not restricted to any of the segments, using the initial segment index file as the target segment index file;

transmitting the target segment index file to the terminal device;

acquiring comments on the segments in the media segments provided by a plurality of user terminals that have played the media segments;

dividing the comments into multiple categories and determining characteristics of a segment according to a category that includes greater quantity of comments than other categories in the multiple categories;

determining real-time segment ratings of the segments in the media segments according to segment ratings of the segments in the media segments and the characteristics on the segments in the media segments; and updating the stored initial segment index file of the media segments according to the real-time segment ratings of the segments in the media segments.

2. The method according to claim 1, wherein the determining, by the server, a target segment set according to the segment index file of the media segments comprises:

using, by the server, non-restricted segments and restricted segments in the media segments corresponding to the segment index file as the target segment set when the media segments requested in the playing request comprise the restricted segments and the terminal device has authority to play the restricted segments; and the determining, by the server, a target segment index file corresponding to the target segment set comprises:

generating, by the server, the target segment index file according to segment indexes of the non-restricted segments and segment indexes of the restricted segments.

3. The method according to claim 2, further comprising:

determining, by the server, the terminal device has authority to play at least one segment having a segment rating lower than or equal to an object rating of a virtual object corresponding to an account when the terminal device has logged in to the account.

4. The method according to claim 1, wherein the determining, by the server, a target segment set according to the segment index file of the media segments comprises:

using, by the server, segments other than restricted segments in the media segments corresponding to the segment index file as the target segment set when the media segments requested in the playing request comprise the restricted segments and the terminal device does not have authority to play the restricted segments; and the determining, by the server, a target segment index file corresponding to the target segment set comprises:

generating, by the server, the target segment index file according to segment indexes of the segments other than the restricted segments in the media segments.

5. The method according to claim 4, further comprising:

transmitting, by the server, a login prompt to the terminal device when the terminal device has not logged in to an account, and determining that the terminal device currently does not have authority to play the restricted segments when the terminal device has not logged in to the account within a preset time.

6. The method according to claim 5, wherein the determining, by the server, a target segment set according to the segment index file of the media segments comprises:

using, by the server, all the media segments corresponding to the segment index file as the target segment set when the media segments comprise only non-restricted segments; and the determining, by the server, a target segment index file corresponding to the target segment set comprises:

generating, by the server, the target segment index file according to segment indexes of all the media segments.

7. The method according to claim 4, further comprising:

determining, by the server, that the terminal device does not have authority to play at least one segment when the terminal device has logged in to an account when to segment ratings of the restricted segments are not lower than or equal to an object rating of a virtual object corresponding to the account.

8. The method according to claim 4, further comprising:

determining, by the server, that the terminal device does not have authority to play the restricted segments when the terminal device has logged in to an account and an object age of a virtual object corresponding to the logged-in account is lower than a preset age.

9. The method according to claim 1, wherein the determining, by the server, a target segment index file corresponding to the target segment set comprises:

determining, by the server, the target segment index file according to a preset mapping relationship and a current segment index file of the media segments, the mapping relationship being a mapping among a segment rating, an object rating, and a segment index.

10. The method according to claim 1, wherein the comments provided by the plurality of user terminals are made based on watching experience of users of the plurality of user terminals.

11. A server, comprising a memory and one or more processors, the memory storing computer-readable instructions, and the computer-readable instructions being executed by the one or more processors to enable the one or more processors to perform:

storing, in the server, only a single initial segment index file of media segments that lists all segments with corresponding restriction information, the restriction information indicating at least one of whether the corresponding segment is a restricted segment or a rating of the corresponding segment;

receiving a playing request transmitted by a terminal device, the playing request requesting to play media segments;

upon receiving the playing request, determining whether the terminal device is restricted to play a segment in the media segments;

in response to the terminal device being restricted to one or more segments, rewriting, in real time, the initial segment index file into a target segment index file by deleting, from the initial segment index file, segment index information of the one or more segments that the terminal device does not have authority to play;

in response to the terminal device being not restricted to any of the segments, using the initial segment index file as the target segment index file;

transmitting the target segment index file to the terminal device to enable the terminal device to download the target segment set according to the target segment index file;

acquiring comments on the segments in the media segments provided by a plurality of user terminals that have played the media segments;

dividing the comments into multiple categories and determining characteristics of a segment according to a category that includes greater quantity of comments than other categories in the multiple categories;

determining real-time segment ratings of the segments in the media segments according to segment ratings of the segments in the media segments and the characteristics on the segments in the media segments; and updating the stored initial segment index file of the media segments according to the real-time segment ratings of the segments in the media segments.

12. The server according to claim 11, wherein the determining a target segment set according to the segment index file of the media segments comprises:

using non-restricted segments and restricted segments in the media segments corresponding to the segment index file as the target segment set when the media segments requested in the playing request comprise the restricted segments and the terminal device has authority to play the restricted segments; and the determining a target segment index file corresponding to the target segment set comprises:

generating the target segment index file according to segment indexes of the non-restricted segments and segment indexes of the restricted segments.

13. The server according to claim 11, wherein the determining a target segment set according to the segment index file of the media segments comprises:

using segments other than restricted segments in the media segments corresponding to the segment index file as the target segment set when the media segments requested in the playing request comprise the restricted segments and the terminal device does not have authority to play the restricted segments; and the determining a target segment index file corresponding to the target segment set comprises:

generating the target segment index file according to segment indexes of the segments other than the restricted segments in the media segments.

14. The server according to claim 13, wherein the computer-readable instructions are executed by one or more processors to further enable the one or more processors to perform:

transmitting, by the server, a login prompt to the terminal device when the terminal device has not logged in to an account, and determining that the terminal device currently does not have authority to play the restricted segments when the terminal device has not logged in to the account within a preset time.

15. The server according to claim 14, wherein the determining, by the server, a target segment set according to the segment index file of the media segments comprises:

using, by the server, all the media segments corresponding to the segment index file as the target segment set when the media segments comprise only non-restricted segments; and the determining, by the server, a target segment index file corresponding to the target segment set comprises:

generating, by the server, the target segment index file according to segment indexes of all the media segments.

16. The server according to claim 13, wherein the computer-readable instructions are executed by one or more processors to further enable the one or more processors to perform:

determining, by the server, that the terminal device does not have authority to play at least one segment when the terminal device has logged in to an account when to segment ratings of the restricted segments are not lower than or equal to an object rating of a virtual object corresponding to the account.

17. The server according to claim 13, wherein the computer-readable instructions are executed by one or more processors to further enable the one or more processors to perform:

determining, by the server, that the terminal device does not have authority to play the restricted segments when the terminal device has logged in to an account and an object age of a virtual object corresponding to the logged-in account is lower than a preset age.

18. The server according to claim 11, wherein the determining a target segment index file corresponding to the target segment set comprises:

determining, by the server, the target segment index file according to a preset mapping relationship and a current segment index file of the media segments, the mapping relationship being a mapping among a segment rating, an object rating, and a segment index.

19. A non-transitory computer readable storage medium storing computer instructions, wherein the computer instructions, when being executed by a processor of a server, cause the processor to perform:

storing, in the server, only a single initial segment index file of media segments that lists all segments with corresponding restriction information, the restriction information indicating at least one of whether the corresponding segment is a restricted segment or a rating of the corresponding segment;

receiving a playing request transmitted by a terminal device, the playing request requesting to play media segments;

upon receiving the playing request, determining whether the terminal device is restricted to play a segment in the media segments;

in response to the terminal device being restricted to one or more segments, rewriting, in real time, the initial segment index file into a target segment index file by deleting, from the initial segment index file, segment index information of the one or more segments that the terminal device does not have authority to play;

in response to the terminal device being not restricted to any of the segments, using the initial segment index file as the target segment index file;

transmitting the target segment index file to the terminal device to enable the terminal device to download a target segment set according to the target segment index file;
acquiring comments on the segments in the media segments provided by a plurality of user terminals that have played the media segments;
dividing the comments into multiple categories and determining characteristics of a segment according to a category that includes greater quantity of comments than other categories in the multiple categories;
determining real-time segment ratings of the segments in the media segments according to segment ratings of the segments in the media segments and the characteristics on the segments in the media segments; and
updating the stored initial segment index file of the media segments according to the real-time segment ratings of the segments in the media segments.

* * * * *